United States Patent
Pardo et al.

(10) Patent No.: US 10,800,692 B2
(45) Date of Patent: Oct. 13, 2020

(54) METHOD FOR THE HYDROTHERMAL CARBONISATION OF A BIOMASS AND ASSOCIATED DEVICE

(71) Applicant: SUEZ INTERNATIONAL, Paris la Defense (FR)

(72) Inventors: Pierre Emmanuel Pardo, Orsay (FR); Jean-Louis Bourdais, Chateaubriant (FR)

(73) Assignee: SUEZ INTERNATIONAL, Paris (FR)

( * ) Notice: Subject to any disclaimer, the term of this patent is extended or adjusted under 35 U.S.C. 154(b) by 89 days.

(21) Appl. No.: 15/324,985

(22) PCT Filed: Nov. 2, 2015

(86) PCT No.: PCT/IB2015/058468
§ 371 (c)(1),
(2) Date: Jan. 9, 2017

(87) PCT Pub. No.: WO2016/071828
PCT Pub. Date: May 12, 2016

(65) Prior Publication Data
US 2017/0210657 A1    Jul. 27, 2017

(30) Foreign Application Priority Data
Nov. 4, 2014  (FR) ..................... 14 60616

(51) Int. Cl.
| C01B 31/02 | (2006.01) |
| C02F 11/10 | (2006.01) |
| F23G 5/027 | (2006.01) |
| C02F 1/00 | (2006.01) |
| C01B 32/05 | (2017.01) |
| C02F 103/00 | (2006.01) |

(52) U.S. Cl.
CPC .............. *C02F 11/10* (2013.01); *C01B 32/05* (2017.08); *C02F 1/008* (2013.01); *F23G 5/0273* (2013.01); *C02F 2103/005* (2013.01); *C02F 2209/02* (2013.01); *C02F 2209/03* (2013.01); *C02F 2301/066* (2013.01); *C02F 2303/10* (2013.01); *C02F 2303/22* (2013.01); *F23G 2202/30* (2013.01); *F23G 2209/12* (2013.01); *Y02W 10/30* (2015.05); *Y02W 10/40* (2015.05)

(58) Field of Classification Search
CPC ...................................................... C01B 32/05
See application file for complete search history.

(56) References Cited

U.S. PATENT DOCUMENTS

| 3,962,076 | A | 6/1976 | Hess et al. |
| 8,603,204 | B2 * | 12/2013 | Ruger ............... C10B 53/02 48/61 |
| 2006/0096163 | A1 | 5/2006 | Dickinson et al. |

FOREIGN PATENT DOCUMENTS

| DE | 20 2011 110246 U1 | 4/2013 |
| EP | 2 206 688 A1 | 7/2010 |
| EP | 2 388 305 A2 | 11/2011 |
| EP | 2 719 748 A1 | 4/2014 |
| WO | 03/043939 A2 | 5/2003 |

OTHER PUBLICATIONS

International Search Report, dated Feb. 19, 2016, from corresponding PCT application.

* cited by examiner

*Primary Examiner* — Stuart L Hendrickson
(74) *Attorney, Agent, or Firm* — Nixon & Vanderhye

(57) ABSTRACT

Disclosed is a method for heating a biomass moving along an industrial treatment line including an inlet (91) for the incoming biomass, a pressure pump (93), a heating unit (94) and a treatment station (95). According to an embodiment, steam is injected into the line between the pressure pump (93) and the heating unit (94) such as to pre-heat the biomass by condensing the steam.

17 Claims, 3 Drawing Sheets

METHOD FOR THE HYDROTHERMAL CARBONISATION OF A BIOMASS AND ASSOCIATED DEVICE

TECHNICAL DOMAIN

Figure 1:
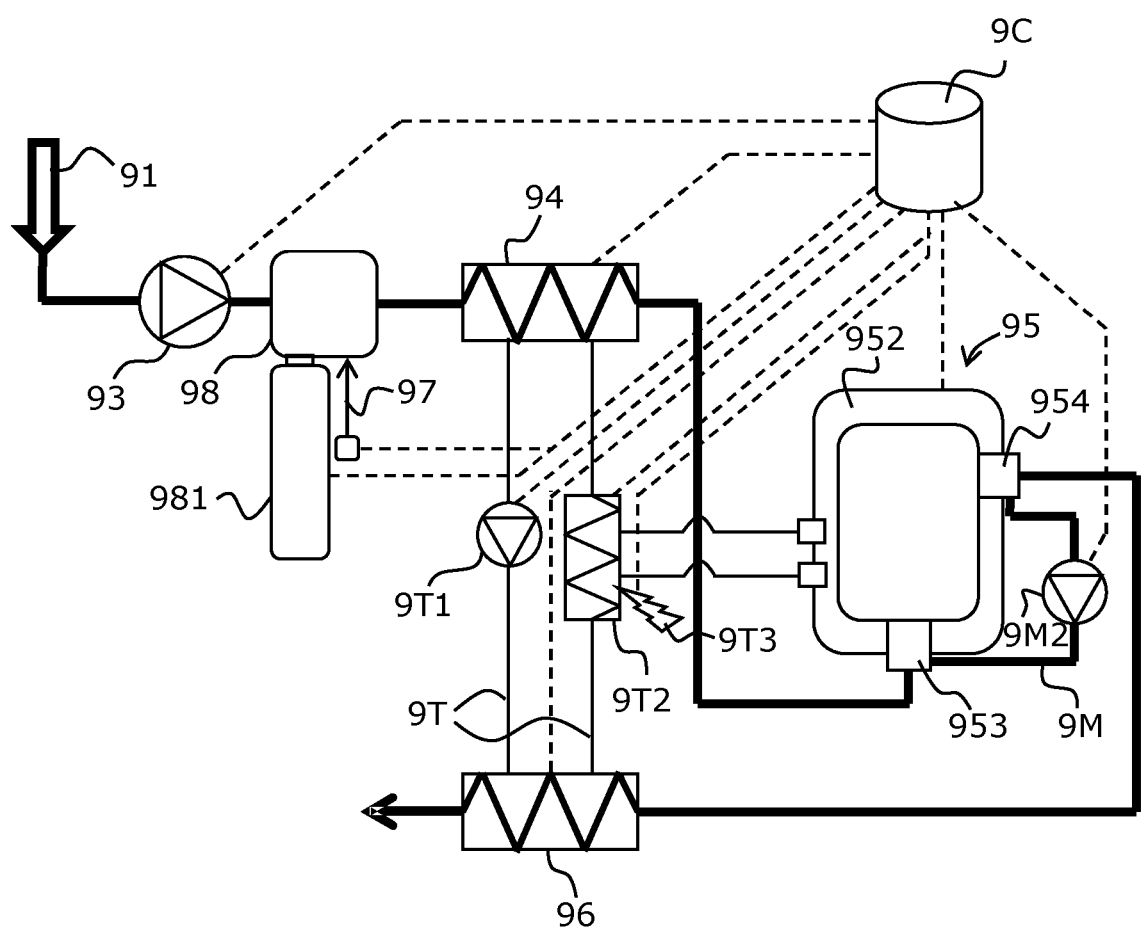

The present invention relates to the domain of thermal and chemical treatment of biomass, such as sludge outputted from a waste water treatment system.

More specifically, the present invention relates to a method for the hydrothermal carbonization of biomass, as well as a device for carrying out such a method.

PRIOR ART

A hydrothermal carbonization method typically involving exposing biomass to a temperature of close to 200° C. and a pressure close to 20 bars is known from the prior art.

Patent EP 2388305 A2 describes a facility including a treatment line on which a biomass is circulated, this line notably including a heat exchanger and a reactor. The heat exchanger is designed to heat up the biomass moving on the line by means of a transfer circuit through which a transfer fluid flows. Having been heated within this heat exchanger, the biomass is then carbonized in the reactor, in which the average residence time of the biomass is around 4 hours.

Patent EP 2388305 A2 also sets out the results of the tests according to which the injection of an additive, such as glycerin, into the biomass helps to significantly reduce the viscosity of said biomass and to significantly facilitate the increase in temperature of the mixture comprising the biomass and the additive inside the reactor.

Such a facility or such a method for hydrothermal carbonization has several drawbacks:
- the reactor is required to provide the energy to increase the temperature of the biomass,
- the residence time of the biomass in the reactor requires the biomass to be stirred inside the reactor to ensure the heat exchange and to ensure uniform heating,
- the temperature gradient between the heating surface of the reactor and the biomass encourages sedimentation of the biomass, which consequently requires the installation of a mixer-scraper in order to remove biomass deposits from the inner walls of the reactor, the mixer-scraper also generating maintenance costs, posing a risk to staff and reducing the reliability of the facility,
- the residence time required to heat the biomass in the reactor limits the volume of biomass that the facility can treat and requires the volume of the reactor to be increased to treat more biomass,
- the temperature increase of the biomass inside the heat exchanger is limited by the relatively high viscosity of the biomass entering the facility; by way of example, dried slurry is at least ten times more viscous than water,
- the thermal characteristics of sewage sludge require the use of significant injection pump power and therefore significant electricity costs.

The present invention is notably intended to overcome all or some of these drawbacks by proposing a method for heating a biomass, and a device for carrying out such a method, by optimizing heat exchanges and exploiting the heat energy produced by carrying out such a method or operating such a device.

DESCRIPTION OF THE INVENTION

For this purpose, the present invention proposes a method for heating a biomass moving along an industrial treatment line comprising an inlet for the incoming biomass, a pressure pump, a heating means and a treatment station, characterized in that steam is injected into the line between the pressure pump and the heating means.

This injection makes it possible to heat the biomass by condensation of the steam.

Preferably, the steam can be injected at a pressure at least 0.2 MPa greater than the pressure of the biomass (pressure of the biomass where the steam is injected). Preferably, the injection speed of the steam can be greater than 130 m/s, for example between 200 and 250 m/s. The steam injection speed is typically generated by the pressure difference between the biomass and the steam injection. The steam speed mentioned above is preferably a speed of the steam just before the steam comes into contact with the biomass.

Preferably, the steam injection flow rate may be up to 20% of the flow rate of the biomass moving on the line.

Such a method helps to reduce the viscosity of the biomass upstream of the heating means compared to a method that does not include such a steam injection. This helps to reduce the pressure drop on the line and improves the heat exchange gain of the heating means.

This results in a greater temperature increase in the biomass.

Advantageously, the biomass is sewage sludge, preferably dried, and the treatment is hydrothermal carbonization.

Indeed, sewage sludge, in particular when dried, has relatively poor heat exchange ratios, which inhibit temperature increases and consequently require very large equipment sizes. The method according to the invention helped to improve the exchange ratios of such sludge. Said equipment sizes may in particular be the size of exchangers.

According to a particularly advantageous feature, the steam injection is controlled, for example by controlling the steam injection flow rate, and the heating means are controlled such that the biomass reaches a preset temperature before reaching the treatment station, the preset temperature being between 165° C. and 205° C., preferably 185° C.

This ensures that the temperature of the biomass, when said biomass reaches the treatment station, is high enough to obviate the need to further increase the temperature of the biomass in the treatment station, in particular if the treatment used is hydrothermal carbonization. This obviates the need for a heating function in the treatment station, thereby eliminating the temperature gradient in the treatment station resulting from this function. Consequently, a method including such a feature helps to limit adhesion by baking (or depositing) of the biomass on the walls of the treatment station, such adhesion or depositing potentially interfering with the heat exchanges in the treatment station. It also obviates the need for any means or operation intended to limit such adhesion or depositing, such as a scraping and/or mixing operation.

Another advantage of eliminating the heating function in the treatment station is that the volume of the treatment station can be reduced for a given quantity of biomass to be treated, since the residence time of the biomass in the treatment station related to the heating function is no longer required.

Advantageously, according to a first variant of the invention, the steam is injected obliquely or preferably perpendicular to the direction of movement of the biomass on the line. This direction of movement of the biomass on the line is the direction in which the biomass moves in a steam injection zone on the line.

An oblique or preferably perpendicular injection cuts into the biomass, encouraging dilution of the steam in the biomass and thereby encouraging the temperature of the biomass to increase by condensation of the steam.

However, the steam may also be injected in the opposite direction to the biomass to obtain such a cutting effect.

The steam may also be injected in the same direction as the biomass.

Advantageously, according to a second variant of the invention, which may be combined with the first variant of the invention, the steam injected into the biomass is mixed by guiding said steam and said biomass through a static mixer, for example in the form of chicanes, and Archimedes screw or static guide surfaces able to generate turbulence in the biomass and in the steam flowing through such a mixer. More specifically, such chicanes or such an Archimedes screw or such static guide surfaces are able to increase the turbulence in the biomass and in the steam flowing through such a mixer. Preferably, such mixing of the steam and the biomass through the static mixer occurs after the prior dynamic mixing of the steam and biomass, i.e. after the steam injection zone on the line, in this case in the mixer.

Alternatively, the steam may be injected in a jet pipe layout, which helps to improve the pressurization of the biomass, as well as performing the mixing.

According to an advantageous feature, the steam injection is controlled to bring the temperature of the biomass to a value exceeding 70° C. at the inlet of the heating means. In this case, the steam flow rate is controlled to achieve this.

According to another advantageous feature, the pressure pump increases the pressure of the biomass to a value at which the biomass can be heated to a temperature exceeding 100° C. without boiling. In other words, the pressure pump can raise the pressure of the biomass above the saturation pressure, which is typically greater than 1.2 MPa.

According to another advantageous feature, the pressure at the outlet of the pressure pump is greater than 3 MPa.

These features enable the controlled raising of the temperature of the biomass.

Advantageously, according to a variant of a first type, the line also includes a cooling station downstream of the treatment station and a transfer fluid is heated when moving between the cooling station and the heating means.

Very advantageously, the transfer fluid is heated to a temperature exceeding the temperature of the biomass at the treatment station. The heat transferred to the heating means can then heat the biomass up to said preset temperature before the biomass reaches the treatment station. Preferably, this enables the transfer fluid to be heated to a temperature exceeding 220° C.

According to a very advantageous feature, a single external heat source is used to heat the transfer fluid, along with a heat-transfer fluid intended to increase and/or maintain the temperature of the biomass at the treatment station. In other words, the same external heat source is used to heat:
firstly the transfer fluid, thereby enabling the biomass to be heated before the biomass reaches the treatment station, and
secondly the heat-transfer fluid, thereby enabling the temperature of the biomass to be maintained in the treatment station, preferably at at least 180° C.

Such use of the external heat source to heat the transfer fluid helps to limit the size of the heating means.

Advantageously, the external heat source may be a boiler burner.

According to an advantageous variant of a second type, heat is recovered from the biomass downstream of the treatment station and this recovered heat is transferred to the biomass upstream of the treatment station.

Preferably, heat can be recovered from the biomass downstream of the treatment station and transferred to the biomass upstream of the treatment station using direct or indirect heat exchange means between the biomass leaving the treatment station and the biomass moving on the line upstream of the treatment station.

According to an advantageous feature of the invention, the method includes a step in which an additive is injected into the biomass upstream of the heating means.

The additive injected may be any catalyst able to decompose the organic matter, for example an acid such as sulfuric acid or a catalyst such as the one described in patent EP 2388305 A2.

Such an injection step also helps to reduce the viscosity of the biomass and to facilitate the heating of same, as well as reducing fouling on the line.

Alternatively, the injection step may be carried out downstream of or within the heating means.

Very advantageously, the additive is injected into the biomass such that the additive is exposed to the injected steam. In other words, the additive is injected into the biomass such that the additive, when injected, is exposed to a steam flow generated by the steam injector.

The additive is thus mixed with the biomass under the action of the steam, which creates a turbulence zone. More specifically, the additive is closely mixed with the biomass, which has been shredded into particles, under the action of the steam, which creates a turbulence zone.

Preferably, the additive and the steam may be injected into the biomass in an internal volume of a receptacle, said receptacle being for example a recipient or a pipe or a piping element. According to another advantageous feature of the invention, a portion of the biomass is removed from the treatment station using a recirculation branch and said portion is returned to the treatment station in order to generate a movement of the biomass in the treatment station.

Such removal and return of some of the biomass in the treatment station helps to limit the adhesion or depositing of the biomass in the treatment station, and to obviate the need for any means or operations intended to limit such adhesion or depositing.

Advantageously, the portion of biomass is removed at a flow rate of between 5 and 15 times the flow rate at which the biomass enters the treatment station.

Preferably, the injected steam and the biomass can be mixed on the line between the pressure pump and the heating means using a mixer.

The invention also relates to a device for carrying out a method according to the different combinations of features described above, this device including an industrial treatment line comprising:
  an inlet arranged to bring the incoming biomass onto the line,
  a pressure pump designed to move the biomass on the line,
  heating means designed to heat the biomass,
  a treatment station designed to keep the biomass substantially at an entry temperature at which it enters the treatment station, the treatment station being installed downstream of the heating means,
  at least indirect heat exchange means to exchange heat between the biomass leaving the treatment station and the biomass moving on the line upstream of the treatment station,
  steam generation means, a mixer designed to mix the steam produced by the steam generation means and the biomass on the line between the pressure pump and the heating means.

The expression "at least indirect" means indirect or direct heat exchange means, for example as shown in the embodiments described below.

Preferably, the steam generation means and the mixer may be designed to inject the steam into the mixer at a pressure of at least 0.2 MPa greater than the pressure of the biomass where the steam is injected. Preferably, the steam generation means and the mixer may be designed to inject the steam into the mixer at a steam injection speed exceeding 130 m/s, for example of between 200 and 250 m/s. The steam injection speed is typically generated by the pressure difference between the biomass and the steam injection, and/or the respective dimensions of the steam and biomass injection members.

Preferably, the device may be designed to inject the steam into the mixer at a steam injection flow rate corresponding to 20% or less of the flow rate of the biomass moving on the line.

Preferably, the steam generation means and the mixer may be designed to inject the steam obliquely or preferably perpendicular to the direction of movement of the biomass on the line. This direction of movement of the biomass on the line is the direction in which the biomass moves in a steam injection zone on the line.

However, the steam generation means and the mixer may also be designed to inject the steam in the opposite direction to the biomass.

Alternatively, the steam generation means and the mixer may be designed to inject the steam in the same direction as the biomass.

Preferably, the device also includes injection means that are able to inject an additive on the line.

Preferably, the mixer may include a receptacle such as a recipient or a pipe or a piping element.

The steam speed mentioned above is preferably a speed of the steam just before the steam comes into contact with the biomass, i.e. in the steam injection zone on the line, this zone being located in the internal volume of the receptacle.

Preferably, the mixer may be or comprise a static mixer, preferably inside a receptacle such as the one mentioned above.

According to an advantageous feature, the heat exchange means include:
a transfer circuit through which a transfer fluid flows to heat the biomass in the heating means by heat exchange between the transfer fluid and the biomass, and
means for circulating the transfer fluid, preferably a pump, that are able to circulate the transfer fluid in the transfer circuit.

Preferably, the device can be designed to heat the transfer fluid to a temperature exceeding 220° C.

The pressure pump can be designed to raise the pressure of the biomass above the saturation pressure, which is typically greater than 1.2 MPa.

According to another advantageous feature, the device also has an external heat source designed to heat the transfer fluid and a heat-transfer fluid flowing in an envelope of the treatment station, preferably such as to raise and/or maintain the temperature of the biomass in the treatment station. Preferably, the transfer fluid and the heat-transfer fluid are identical.

Preferably, the external heat source can be designed:
firstly to heat the biomass before the biomass reaches the treatment station, and
secondly to maintain the temperature of the biomass in the treatment station, preferably at at least 180° C.

Such an external heat source helps to limit the size of the heating means and to compensate for energy losses.

Very advantageously, the device is arranged such that the biomass enters the treatment station via a lower portion and exits via an upper portion.

Biomass, particularly sewage sludge, is denser than the surrounding water. The solid fraction, surrounded by undissolved organic matter, will therefore tend, under the effect of gravity, to descend below those fractions that are already dissolved, i.e. fractions in which the carbonization reactions are underway or already complete. The residence time of an uncarbonized biomass fraction in the treatment station is therefore increased compared to a device in which the biomass enters via an upper portion and exits via a lower portion.

The relative increase in the residence time of the biomass in the treatment station helps to improve the quality of the treatment.

According to a very advantageous feature, the device according to the invention also includes a recirculation branch designed to remove a portion of biomass from the treatment station and to return this biomass portion to the treatment station.

According to an advantageous feature, the treatment station is mechanically passive, i.e. does not include a scraper or a mixer.

Such components are hazardous for staff and jeopardize the availability of the facility.

Advantageously, the treatment station is a hydrothermal carbonization reactor for sewage sludge.

DESCRIPTION OF FIGURES AND EMBODIMENTS

Figure 2:
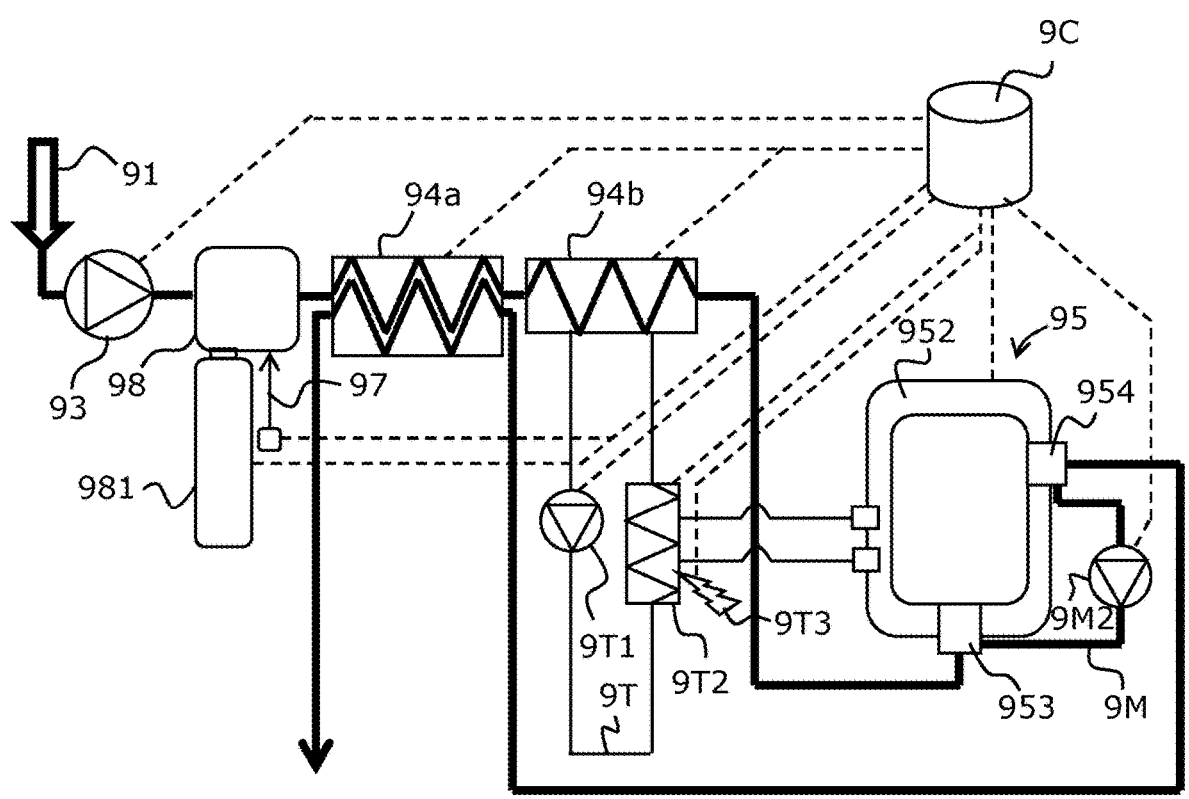
Figure 3:
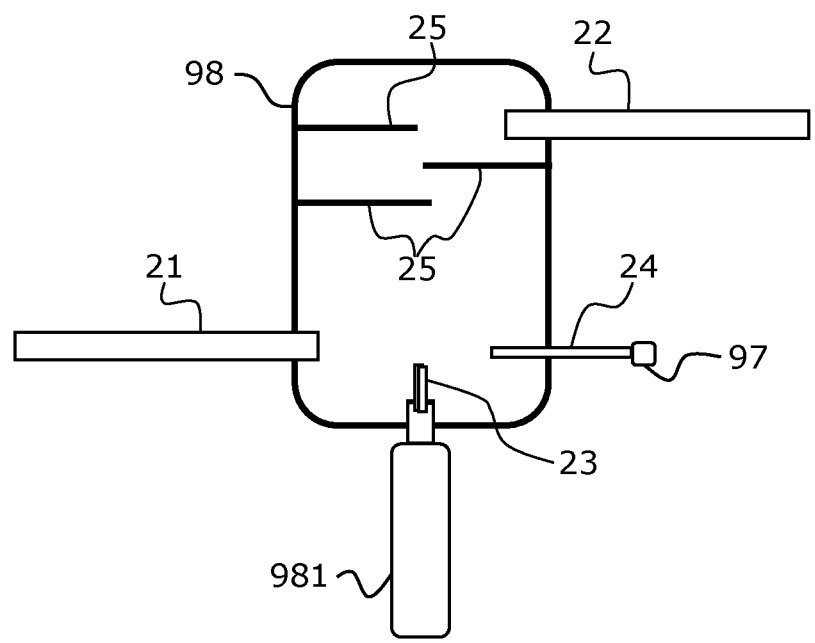
Figure 4:
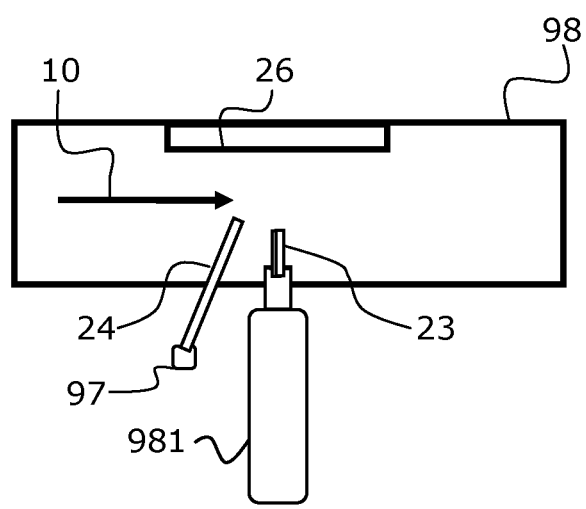

Other advantages and details of the invention are set out in the detailed description of non-limiting embodiments and implementations, and the following attached drawings:

FIG. 1 is a schematic view of a hydrothermal carbonization device according to the invention including a cooling station, FIG. 2 is a schematic view of a hydrothermal carbonization device according to the invention including direct heat exchange means, FIGS. 3 and 4 are schematic views of mixers according to the invention.

Since the embodiments described below are in no way limiting, variants of the invention including only a selection of the features described are possible, said features being independent of the other features described, even if said other features are described in the same sentence, if said selection is sufficient to afford a technical advantage or to differentiate the invention from the prior art. Said selection includes at least one feature, preferably a functional feature with no structural details or with only some structural details if same are sufficient to afford a technical advantage or to differentiate the invention from the prior art.

FIG. 1 illustrates a preferred embodiment of the invention.

According to this embodiment, the device according to the invention includes an industrial treatment line through which the biomass is circulated.

The incoming biomass, for example dried sewage sludge, enters via an inlet 91 on the line where same enters piping linking the inlet 91 to a mixer 98, said piping having a pressure pump 93 between the inlet 91 and the mixer 98.

The pressure pump 93 increases the pressure of the biomass to a value at which the biomass can be heated to a temperature exceeding 100° C. without boiling. In other words, the pressure pump 93 raises the pressure of the biomass above the saturation pressure, which is typically greater than 1.2 MPa.

The pressure pump 93 circulates the biomass on the line.

More specifically, the pressure pump 93 is able to raise the pressure of the biomass exiting the pump 93 to a value exceeding 3 MPa (piston pump, diaphragm pump or other).

Under the effect of the pressure pump 93, the biomass is routed from the pressure pump 93 to the mixer 98.

The mixer 98 is designed to mix the steam produced by steam generation means 981 with the biomass. The mixer 98 may be a static mixer (means requiring the biomass and the steam to be channeled together for a sufficient time to encourage the steam and the biomass to mix together), or a mixer designed to receive the steam perpendicular to the direction of movement of the biomass in the piping linking the pressure pump 93 and the heating means 94, or have a jet pipe layout.

The steam flow rate is preferably set, for example using control means 9C, to raise the temperature of the biomass (which may have been mixed with an additive) to an optimum operating point both in relation to the size of the different elements of the device, for example the heating means 94, and in terms of the total energy consumption of the device. The steam flow rate is preferably set by adjusting the flow rate of the steam injected.

For example, the steam is injected at a pressure greater than the pressure of the biomass on the line upstream of the pressure pump 93, and consequently at a temperature greater than the temperature of the biomass. However, the steam generation means 981 are controlled to raise the temperature of the biomass such as to optimize the energy recovery implemented in the device.

Typically, the steam injection flow rate may be up to 20% of the flow rate of the biomass moving on the line.

Preferably, an additive is injected into the biomass using any suitable injection means 97, preferably upstream of the heating means 94, in order to further reduce the viscosity of the biomass.

The additive is preferably injected such as to expose same to the action of the steam, thereby encouraging same to mix with the biomass.

Piping also links the mixer 98 to heating means 94.

The heating means 94 are preferably a heat exchanger.

These heating means 94 are used to heat the biomass by thermal exchange between a transfer fluid flowing in the transfer circuit 9T and the biomass passing through the heating means 94. To do so, the transfer fluid, for example oil, is itself heated using a heat source 9T3 by means of a heat exchanger 9T2, this heat source being for example a boiler burner.

Piping also links the heating means 94 to a treatment station 95 towards which the biomass is routed.

The treatment station 95 is preferably a reactor including a chamber designed to receive the biomass and to keep said biomass at a pressure typically between 2 and 3 MPa.

In a preferred embodiment, the sole function of the treatment station 95 is to guarantee a residence time that enables the biomass to undergo chemical reactions, typically hydrolysis. For this reason, the treatment station 95 may alternatively include a reactor, with or without chicanes, with or without pipes, or for example in a pipe long enough to guarantee the required residence time.

Preferably, the biomass coming from the heating means 94 enters the chamber of the treatment station 95 via a lower portion 953, i.e. via a portion of the treatment station 95 at a height that is substantially the lowest in the treatment station 95 within the premises housing the device.

According to the embodiment in FIG. 1, piping also links the treatment station 95 to a cooling station 96.

After a residence time, the (hydrolyzed) biomass exits the chamber of the treatment station 95 via an upper portion 954, from where same is routed towards the cooling station 96. Upper portion 954 means a portion of the treatment station 95 at a height that is substantially the highest in the treatment station 95 within the premises housing the device, opposed to the lower portion 953.

Alternatively, the biomass may also enter the treatment station 95 via an upper portion and exit via a lower portion.

According to another embodiment, the biomass may also enter the treatment station 95 via a lower portion and be routed from this lower portion as far as an upper portion of the chamber via a pipe, the biomass being able to exit the chamber of the treatment station 95 via a lower portion.

The cooling station 96 is preferably a heat exchanger.

The cooling station 96 is used to cool the biomass exiting the treatment station 95 by thermal exchange between the transfer fluid flowing in the transfer circuit 9T and the biomass passing through said cooling station 96.

Thus, the transfer circuit 9T links the heating means 94 to the cooling station 96. It also includes, along with the heating means 94 and the cooling station 96, heat exchange means between the biomass leaving the treatment station 95 and the biomass moving on the line upstream of the treatment station 95.

As shown in FIG. 1, the transfer fluid is circulated in the transfer circuit 9T using circulation means 9T1, typically a pump.

An external heat source 9T3, for example a boiler burner, heats the transfer fluid at the heat exchanger 9T2. The biomass flowing in the heating means is heated by the transfer fluid thus heated, drawing some of the heat from same.

The transfer fluid also recovers some of the heat from the biomass flowing through the cooling station 96.

The transfer fluid is for example heated to a temperature exceeding 220° C.

Alternatively, according to an embodiment shown in FIG. 2, some of the heat of the biomass flowing on the line downstream of the treatment station 25 is transferred to the biomass flowing through a thermal regenerator 94a installed upstream of the heating device 94b. In this case, the heat exchange means exchange heat directly between the biomass leaving the treatment station 95 and the biomass moving on the line upstream of the treatment station 95, using the thermal regenerator 94a.

In a preferred embodiment, the chamber of the treatment station 95 is surrounded by an envelope 952 in which a heat-transfer fluid is circulated.

This heat-transfer fluid is heated and kept at a temperature designed to keep the biomass contained within the chamber at the temperature of same before entering the treatment station 95, i.e. when the biomass is between the heating means 94 and the treatment station 95, and to compensate for any thermal losses related to the structure of the treatment station 95.

The heat-transfer fluid is preferably heated using the same external heat source 9T3 as the source used to heat the transfer fluid at the heat exchanger 9T2. The transfer fluid and the heat-transfer fluid may therefore be the same fluid, for example oil, flowing in a circuit designed to heat the transfer fluid (flowing in the circuit 9T) and the heat-transfer fluid (flowing in the envelope 952) at the desired temperatures. The differential control of the temperatures of the transfer fluid and the heat-transfer fluid is provided by any appropriate means, for example valves (not shown) mounted on said circuit and control of the opening and closing of said valves as well as of the heat source 9T3.

In order to increase the temperature of the biomass on the line at the heating means 94, the device is controlled, for example using the control means 9C, so that the heat source 9T3 increases the temperature of the transfer fluid to a temperature above the temperature of the biomass contained in the treatment station 95, for example to a temperature close to 210° C.

Thus, a single external heat source 9T3 is used to heat the transfer fluid and the heat-transfer fluid intended to increase and/or maintain the temperature of the biomass at the treatment station 95. In other words, the same external heat source 9T3 is used to heat:
- firstly the transfer fluid, thereby enabling the biomass to be heated before the biomass reaches the treatment station, and
- secondly the heat-transfer fluid, thereby enabling the temperature of the biomass to be maintained in the treatment station, preferably at at least 180° C.

To limit the depositing of biomass on the walls of the chamber of the treatment station 95 when using a mechanically passive treatment station 95 (i.e. with no scraper or mixer), the treatment station 95 preferably includes a recirculation branch 9M designed to circulate the biomass inside the chamber. To do so, the biomass is preferably suctioned from the upper portion 954 (where the biomass is more liquid) and reinjected into the chamber via a lower portion 953. Preferably, the flow rate of this recirculation is set such that the biomass circulating in the recirculation branch 9M is removed at a flow rate of between 5 and 15 times the flow rate of the biomass entering the treatment station 95 from the heating means 94. Such recirculation ensures good temperature uniformity in the biomass contained in the treatment station 95.

This biomass is preferably circulated in the recirculation branch 9M using a diaphragm pump 9M1, that is preferably sealed and offset from the treatment station 95. Such a pump 9M1 and thus installed increases the reliability of the device, since this pump 9M1 can for example be repaired and maintained without having to take the entire device out of service.

The different solutions proposed by the present invention help to reduce the viscosity of the biomass and consequently facilitate increasing the temperature of same using smaller means.

The surface of the heat exchangers (heating means 94, 94b and/or cooling station 96), the diameters of the piping and the volume of the treatment station 95 can thus be reduced.

An example mixer 98 according to the invention is shown in FIG. 3. The biomass enters the mixer 98 via a feed channel 21 that is for example linked to the pressure pump 93 shown in FIG. 1. When the biomass reaches the internal volume of the mixer 98, the biomass is exposed to the steam injected by the steam generation means 981 via a nozzle 23. In this example, the steam is injected perpendicular to the feed channel 21. Acid is also injected as an additive into the biomass inside the internal volume of the mixer 98 using the injection means 97, which include an injection head 24. The biomass, steam and acid are thus mixed dynamically in the mixer 98, for example and notably under the effect of the pressure difference between the steam injection and the biomass, which is preferably greater than 0.2 MPa. By way of example, the biomass enters the mixer at a speed of less than 1 m/s and the steam is injected into the mixer 98 at a speed exceeding 130 m/s, preferably between 200 and 250 m/s. The mixture is directed towards the output channel 22, for example towards the heating means 94 shown in FIG. 1. Optionally, the mixer 98 may include a static mixer, for example comprising chicanes 25. In the example in FIG. 3, the steam is injected obliquely or perpendicular to the direction of movement of the biomass in the internal volume of the mixer 98. The steam injection flow rate is 20% or less, and typically between 10% and 20%, of the flow rate of the biomass moving on the line.

Another example mixer 98 according to the invention is shown in FIG. 4. In this example, the mixer 98 includes a wear part 26 designed to limit or prevent erosion of the portion of the mixer 98, in this example a pipe, exposed to the flow of steam generated by the steam injection. This wear part 26 faces the nozzle 23 and is preferably removable. In the example in FIG. 4, the steam is injected perpendicular to the direction of movement of the biomass in the internal volume of the mixer 98, with the biomass moving in the direction 10.

The invention is naturally not limited to the examples described above and numerous adjustments may be made to these examples without thereby moving outside the scope of the invention. Furthermore, different features, forms, variants and embodiments of the invention may be associated with one another in different combinations where same are not incompatible or mutually exclusive.

In the variant shown in FIGS. 3 and 4, the steam is injected in the direction opposite to the direction of movement of the biomass in the internal volume of the mixer 98.

The invention claimed is:

1. A method for heating biomass moving along an industrial treatment line comprising an inlet for incoming biomass, a pressure pump, a heater and a carbonization reactor, said method comprising injecting steam into the line between the pressure pump and the heater and upstream of the heater.

2. The method as claimed in claim 1, wherein the biomass is sewage sludge and said industrial treatment is hydrothermal carbonization.

3. The method as claimed in claim 1, wherein the steam injection and the heater are controlled such that the biomass reaches a preset temperature before reaching the carbonization reactor, the preset temperature being between 165° C. and 205° C.

4. The method as claimed in claim 1, wherein the steam injection is controlled to bring the temperature of the biomass to a value exceeding 70° C. at the inlet of the heater.

5. The method as claimed in claim 1, wherein the steam is injected obliquely or perpendicular to the direction of movement of the biomass on the line, or against the direction of movement of the biomass on the line.

6. The method as claimed in claim 1, wherein the pressure pump increases the pressure of the biomass to a value at which the biomass can be heated to a temperature exceeding 100° C. without boiling.

7. The method as claimed in claim 6, wherein the pressure at the outlet of the pressure pump is greater than 3 MPa.

8. The method as claimed in claim 1, wherein the line also includes a cooling station downstream of the carbonization reactor, and wherein a transfer fluid is heated when moving between the cooling station and the heater.

9. The method as claimed in claim 8, wherein the transfer fluid is heated to a temperature exceeding the temperature of the biomass, said biomass being at the carbonization reactor.

10. The method as claimed in claim 8, wherein a single external heat source is used to heat the transfer fluid and a heat-transfer fluid is used to increase and/or maintain the temperature of the biomass at the carbonization reactor.

11. The method as claimed in claim 1, wherein heat is recovered from the biomass downstream of the carbonization reactor and wherein this recovered heat is transferred to the biomass upstream of the carbonization reactor.

12. The method as claimed in claim 1, wherein heat is recovered from the biomass downstream of the carbonization reactor and wherein this recovered heat is transferred to the biomass upstream of the carbonization reactor using a heat exchanger between the biomass leaving the carbonization reactor and the biomass moving on the line upstream of the carbonization reactor.

13. The method as claimed in claim 1, wherein includes a step in which an additive is injected into the biomass upstream of the heater.

14. The method as claimed in claim 13, wherein the additive is injected into the biomass such that the additive is exposed to the injected steam.

15. The method as claimed in claim 1, wherein a portion of the biomass is removed from the carbonization reactor using a recirculation branch and said portion is returned to the carbonization reactor in order to generate a movement of the biomass in the carbonization reactor.

16. The method as claimed in claim 15, wherein the portion of biomass is removed at a flow rate of between 5 and 15 times the flow rate at which the biomass enters the carbonization reactor.

17. The method as claimed in claim 1, wherein the injected steam and the biomass are mixed on the line between the pressure pump and the heater using a mixer.

\* \* \* \* \*